United States Patent
Zhang et al.

(10) Patent No.: US 9,904,550 B2
(45) Date of Patent: Feb. 27, 2018

(54) METHODS FOR COMBINING INSTRUCTIONS AND APPARATUSES HAVING MULTIPLE DATA PIPES

(71) Applicant: VIA Alliance Semiconductor Co., Ltd., Shanghai (CN)

(72) Inventors: Huaisheng Zhang, Shanghai (CN); Zhou Hong, Cupertino, CA (US); Heng Qi, Shanghai (CN)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 239 days.

(21) Appl. No.: 14/855,580

(22) Filed: Sep. 16, 2015

(65) Prior Publication Data

US 2017/0060594 A1 Mar. 2, 2017

(30) Foreign Application Priority Data

Aug. 24, 2015 (CN) .......................... 2015 1 0521991

(51) Int. Cl.
*G06F 9/45* (2006.01)
*G06F 9/30* (2018.01)
*G06F 9/38* (2018.01)

(52) U.S. Cl.
CPC ........ *G06F 9/30181* (2013.01); *G06F 9/3001* (2013.01); *G06F 9/3005* (2013.01);
(Continued)

(58) Field of Classification Search
CPC ... G06F 8/41; G06F 8/45; G06F 8/456; G06F 8/447; G06F 9/45516; G06F 9/5066
See application file for complete search history.

(56) References Cited

U.S. PATENT DOCUMENTS 6,237,086 B1  5/2001  Koppala et al.
7,937,561 B2  5/2011  Col et al.
(Continued)

FOREIGN PATENT DOCUMENTS

CN  101180611 A  5/2008
CN  101238454 A  8/2008
(Continued)

OTHER PUBLICATIONS

Kawahito et al., "Instruction Combining for Coalescing Memory Accesses Using Global Code Motion", ACM, MSP 2004, Jun. 2004, pp. 1-11; <https://dl.acm.org/citation.cfm?id=1065897&CFID=1010142667&CFTOKEN=63671704>.*

(Continued)

*Primary Examiner* — Thuy Dao
*Assistant Examiner* — Ben C Wang
(74) *Attorney, Agent, or Firm* — McClure, Qualey & Rodack, LLP

(57) ABSTRACT

A method for combining instructions, performed by a compiler, containing at least the following steps. First instructions are obtained, where each performs one of a calculation operation, a comparison operation, a logic operation, a selection operation, a branching operation, a LD/ST (Load/Store) operation, a SMP (sampling) operation and a complicated mathematics operation. The first instructions are combined as one combined instruction according to data dependencies between the first instructions. The combined instruction is sent to a SP (Stream Processor).

9 Claims, 6 Drawing Sheets

(52) U.S. Cl.
CPC .......... *G06F 9/3802* (2013.01); *G06F 9/3853* (2013.01); *G06F 8/41* (2013.01); *G06F 8/447* (2013.01); *G06F 8/456* (2013.01)

(56) References Cited

U.S. PATENT DOCUMENTS

| | | | |
|---|---|---|---|
| 8,055,883 | B2 | 11/2011 | Lutz |
| 9,053,292 | B2 | 6/2015 | Abdallah |
| 9,639,336 | B2 * | 5/2017 | Grover .................... G06F 8/443 |
| 2004/0193821 | A1 | 9/2004 | Ruhovets et al. |
| 2006/0271738 | A1 | 11/2006 | Tran et al. |
| 2007/0198815 | A1 | 8/2007 | Liu et al. |
| 2009/0013108 | A1 | 1/2009 | Rajamani |
| 2011/0004743 | A1 | 1/2011 | Lutz |
| 2013/0117548 | A1 * | 5/2013 | Grover .................... G06F 8/443 |
| | | | 712/226 |
| 2014/0237458 | A1 * | 8/2014 | Elias .......................... G06F 8/41 |
| | | | 717/148 |
| 2014/0281397 | A1 | 9/2014 | Loktyukhin et al. |
| 2014/0372733 | A1 * | 12/2014 | Diewald ............... G06F 9/3808 |
| | | | 712/226 |
| 2015/0186168 | A1 * | 7/2015 | Jennings ............. G06F 9/45516 |
| | | | 717/148 |
| 2015/0186169 | A1 * | 7/2015 | Jennings ............. G06F 9/45516 |
| | | | 717/148 |
| 2015/0186170 | A1 * | 7/2015 | Jennings ............. G06F 9/45516 |
| | | | 717/148 |
| 2015/0205757 | A1 * | 7/2015 | Dally ....................... G06F 8/437 |
| | | | 708/200 |
| 2015/0347105 | A1 * | 12/2015 | Avkarogullari ....... G06F 8/4441 |
| | | | 717/154 |
| 2016/0092181 | A1 * | 3/2016 | Rodgers .................. G06F 8/447 |
| | | | 717/145 |
| 2016/0139900 | A1 * | 5/2016 | Pudiyapura ............... G06F 8/33 |
| | | | 717/149 |
| 2016/0139934 | A1 * | 5/2016 | Sarangi ............... G06F 9/30032 |
| | | | 712/22 |
| 2016/0179524 | A1 * | 6/2016 | Gschwind ................. G06F 8/41 |
| | | | 712/222 |
| 2016/0328236 | A1 * | 11/2016 | Kamatsuka ............... G06F 8/41 |
| 2016/0357586 | A1 * | 12/2016 | Rose ........................ G06F 9/445 |
| 2017/0039043 | A1 * | 2/2017 | Haupt ..................... G06F 8/447 |
| 2017/0269929 | A1 * | 9/2017 | Hegarty .................... G06F 8/70 |

FOREIGN PATENT DOCUMENTS

| | | |
|---|---|---|
| CN | 101377736 A | 3/2009 |
| CN | 103646009 A | 3/2014 |
| TW | I275994 | 3/2007 |
| TW | I383318 | 1/2013 |
| WO | WO 2006/127857 A1 | 11/2006 |
| WO | WO 2007/018467 A1 | 2/2007 |

OTHER PUBLICATIONS

D. S. Ivanov, "Register allocation with instruction scheduling for VLIW-architectures", Programming and Computer Software, vol. 36, No. 6, 2010, Pleiades Publishing, Ltd, Mar. 2010, pp. 363-367; <https://link.springer.com/content/pdf/10.1134%2FS0361768810060058.pdf>.*

Koo et al., "Revealing Critical Loads and Hidden Data Locality in GPGPU Applications", Nov. 2015, IEEE, pp. 120-129; <http://ieeexplore.ieee.org/stamp/stamp.jsp?tp=&arnumber=7314158>.*

Chinese language Notice of Allowance dated Jul. 22, 2016, issued in application No. TW 104132348.

European Search Report dated Jan. 5, 2017, issued in application No. 15189469.8-1957.

Chinese language office action dated May 10, 2017, issued in application No. CN 201510521991.2.

\* cited by examiner

METHODS FOR COMBINING INSTRUCTIONS AND APPARATUSES HAVING MULTIPLE DATA PIPES

CROSS REFERENCE TO RELATED APPLICATIONS

This application claims the benefit of China Patent Application No. 201510521991.2, filed on Aug. 24, 2015, the entirety of which is incorporated by reference herein.

BACKGROUND

Technical Field

The present invention relates to graphics processing, and in particular, it relates to methods for combining instructions and apparatuses having multiple data pipes.

Description of the Related Art

The GPU (Graphics Processing Unit) architecture typically has hundreds of basic shader processing units, referred to as SPs (Stream Processors). Each SP may deal with one SIMD (Single Instruction Multiple Data) thread of one instruction per cycle, and then switch into another SIMD thread at the next cycle. The performance of GPU is affected by two important factors: the total amount of SPs and the capacities of one SP. Thus, methods for combining instructions and apparatuses having multiple data pipes are introduced to improve the capacities of one SP.

BRIEF SUMMARY

An embodiment of a method for combining instructions, performed by a compiler, contains at least the following steps. First instructions are obtained, where each performs one of a calculation operation, a comparison operation, a logic operation, a selection operation, a branching operation, a LD/ST (Load/Store) operation, a SMP (sampling) operation and a complicated mathematics operation. The first instructions are combined as one combined instruction according to data dependencies between the first instructions. The combined instruction is sent to a SP (Stream Processor).

An embodiment of an apparatus having multiple data pipes is introduced, contains at least a DF (Data Fetch) unit, a bypass-pipe and a main-pipe. The bypass-pipe is coupled to a CR (Common Register), a CB (Constant Buffer) and the DF unit. The main-pipe, coupled to the DF unit and the bypass-pipe, comprises an ALG (Algorithm) unit, a comparison/logic unit and a post-PROC (Process) unit. The ALG, comparison/logic and post-PROC units are coupled in series and each of the ALG, comparison/logic and post-PROC units is coupled to the bypass-pipe.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

The conventional SP (Stream Processor) executes simple operations, such as Algorithm, Compare, Logic, Selection, Branch etc. But a lot of data dependencies exist among adjacent instructions in one shader, so the SP has to read or write CR (common registers) frequently. The data dependencies may consume the CR bandwidth greatly and produce bottlenecks. In addition, the CR RAW (Read after write) issue may arise, decreasing the performance of the instruction execution. Shaders often use move instructions to initialize CRs, which requires the SP to pass data or constants from one CR or CB (Constant Buffer) to another. For a post-processing operation, such as an LD/ST (load/store) unit for data access, an SMP (sampling) unit for texture sampling, an SFU (Special Function unit), etc., the SP is responsible for reading one or more source values from CRs or CBs, and then passing them on to corresponding post-processing units. In such cases, it is not necessary to walk data or constants through algorithm execution, leading to wasting a certain level of SP capacity. A novel architecture with two data paths in one SP is introduced to improve SP performance. The first path may be referred to as a main-pipe with Algorithm, Compare, Logic, Selection and Branch operations, while the second path may be referred to as a bypass-pipe for a data- or constant-reading from one CR or CB and a passing to another CR or one post-processing unit.

Figure 1:
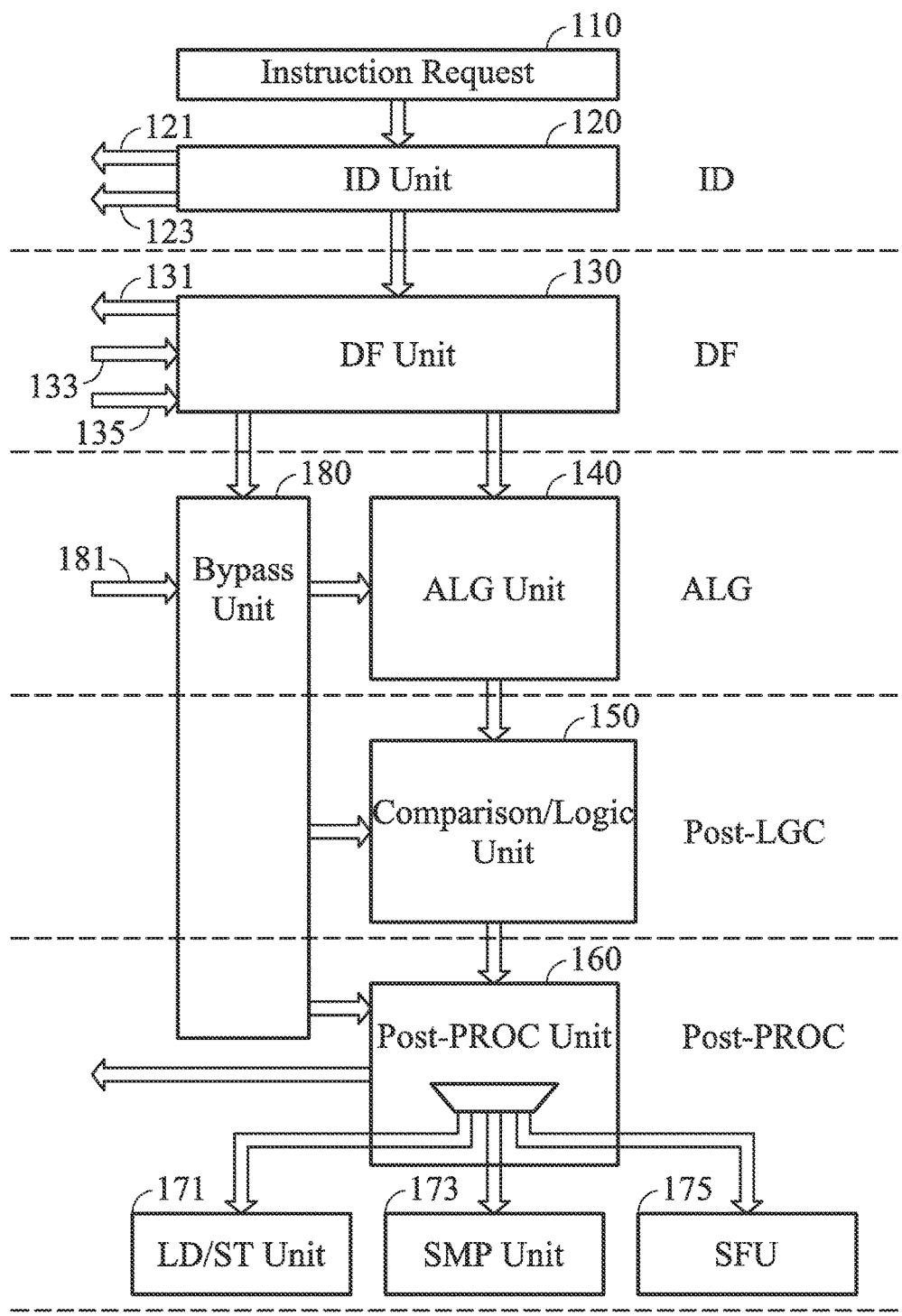
FIG. 1 is the system architecture of a 3D (three-dimensional) graphics processing apparatus according to an embodiment of the invention.

FIG. 1 is the system architecture of a 3D (three-dimensional) graphics processing apparatus according to an embodiment of the invention. An SP executes instructions by using two pipes: the main-pipe; and the bypass-pipe. The main-pipe may contain three stages in order: the ALG (Algorithm) stage; the Post-LGC (Logic) stage including the Comparison and/or Logic operations; and the Post-PROC (Process) stage including the selection, branching and/or result WB (Write Back) operations. Results of one stage may be carried to the next stage. Final results may be stored in CRs or output to the post-processing unit. Specifically, the ID (Instruction Decode) unit 120 decodes the instruction request 110 sent from the compiler, and informs the relevant devices of the CR address 121 and/or the CB address 123 for data or constants to be obtained. The ID unit 120 may obtain Opcode (Operation Code) from the instruction request 110. The DF (Data Fetch) unit 130 obtains data 133 stored at the CR address 121 and/or constants 135 stored at CB address 123, and if required, inform the relevant devices of the CR address 131, to which data is to be written back. The obtained data 133 and/or constants 135 may be referred to as operands. The ALG unit 140 performs a calculation operation on the obtained data. The calculation operations may include addition, subtraction, multiplication, division, left shift, right shift, and the like. The comparison/logic unit 150 may perform the comparison or logic operation according to the results generated by the ALG unit 140. The comparison operations may include maximum, minimum, comparison, and the like. The logic operations may include AND, OR, NOT, NOR, XOR, and the like. The Post-PROC unit 160 may write the calculated data back to the CB or send the calculated data to one of the LD/ST unit 171, the SMP unit 173 and the SFU 175 according to the result generated by the comparison/logic unit 150. The SFU 175 implements complicated mathematics operations, such as SIN, COS, SQRT, etc. The bypass-pipe may include the bypass unit 180 sending data or a constant 181 from one CR or CB to another CR or the Post-PROC unit 160.

Instructions used in the compiler may be classified into three kinds: main-pipe; bypass-pipe; and post-process-unit. The main-pipe instructions are used in the ALG, Post-LGC and Post-PROC stages. The ALG stage may use the following ALG instructions: FMAD, FADD, FMUL, IMUL24, IMUL16, IADD, SHL, SHR, FRC, FMOV, IMUL32I, IMUL24I, IADDI, IMAXI, IMINI, SHLI, SHRI, etc. The Post-LGC stage may use CMP/LGC (Comparison/Logic) instructions, such as IMAX, IMIN, FCMP, ICMP, IMAXI, IMINI, NOR, AND, OR, XOR, ICMPI, NORI, ANDI, ORI, XORI, etc. The Post-PROC stage may use SEL/Branch instruction, such as SEL, B, BL, IFANY, IFALL, etc. The post-processing-unit instructions are used in the LD/ST unit 171, the SMP unit 173 and SFU 175. The LD/ST unit 171 may perform the loading and storing instructions, such as LDU, STU, REDU, LDT, STT, REDUT, GLD, GST, GREDU, etc. The SMP unit 173 may perform the texture sampling instructions, such as SAMPLE, SAMPLE_B, SAMPLE_L, SAMPLE_C, SAMPLE_D, SAMPLE_GTH, SAMPLE_FTH, etc. The SFU 175 may perform the mathematics computation instructions, such as RCP, RSQ, LOG, EXP, SIN, COS, SQRT, etc. The bypass-pipe instructions may contain moving instructions, such as MOV, MOVIMM, etc.

Figure 2:
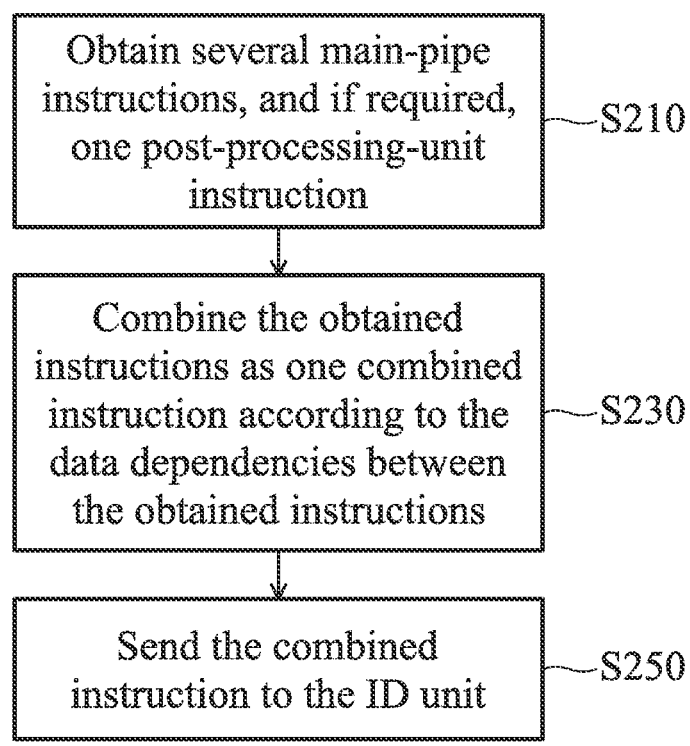
FIG. 2 is a flowchart illustrating a method for combining instructions according to an embodiment of the invention.

With the above architecture, the compiler may combine several main-pipe instructions and the post-processing-unit instructions as one according to the data dependencies between the instructions, referred to as the static combination. FIG. 2 is a flowchart illustrating a method for combining instructions according to an embodiment of the invention. The compiler may obtain several main-pipe instructions, and if required, one post-processing-unit instruction (step S210), combine the obtained instructions as one combined instruction according to the data dependencies between the obtained instructions (step S230) and send the combined instruction to the ID unit 120 (step S250). In step S230, the compiler may perform the static combination according to the following rules:
ALG+CMP+SEL;
ALG+CMP+SEL+SFU/LS/SMP;
ALG+CMP+Branch;
ALG+LGC+SEL;
ALG+LGC+SEL+SFU/LS/SMP; or
ALG+LGC+Branch.

ALG indicates calculation instructions, CMP indicates comparison instructions, LGC indicates logic instructions, SEL indicates selection instructions, Branch indicates branching instructions, SFU indicates mathematics computation instructions, LS indicates Load/Store instructions and SMP indicates sampling instructions. An example is introduced to explain the static combination, where exemplary pseudo code is as follows:

```
x=a+b;
if (x>c)
{
    x=c;
}
```

The compiler performs the static combination to the pseudo code and translates it into the following machine code:

```
FADD       SFWD,  R4,   R8
+FCMP_GT   P1,    R5    SFWD
+SEL       R0,    P1,   SFWD,  R5
```

First machine code instructs to add the value of CR R8 to the value of CR R4 (that is, the values of variables b and a), and send the result to the next stage, in which "SFWD" indicates a passing of the result (that is, the value of variable x) to the next stage. Second machine code instructs to compare the value of CR R5 (that is, the value of variable c) with the value received from the prior stage (that is, the value of variable x), in which "+" indicates that this instruction is combined with the previous one and "SFWD" indicates a reception of the result from the prior stage. Third machine code instructs to write the value received from the prior stage (that is, the value of variable x) or the value of CR R5 (that is, the value of variable c) into the CR R according to the flag P1, in which "+" indicates that this instruction is combined with the previous one. If the flag P1 is "1", the value of CR R5 (that is, the value of variable c) is written into the CR R0. Otherwise, the value received from the prior stage (that is, the value of variable x) is written into the CR R0.

Figure 3A:
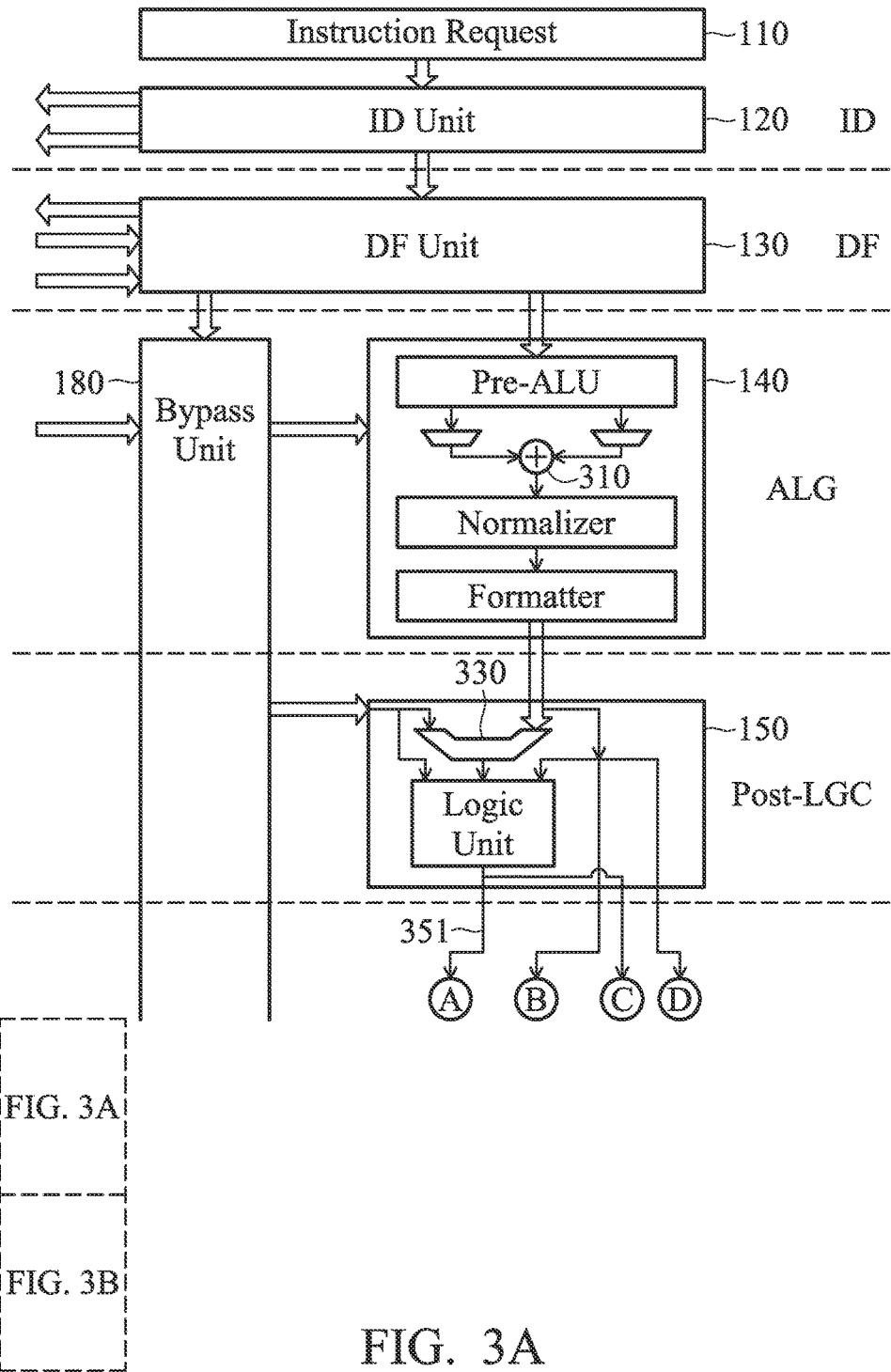
FIGS. 3A and 3B illustrate the system architecture of a 3D graphics processing apparatus according to an embodiment of the invention.
Figure 3B:
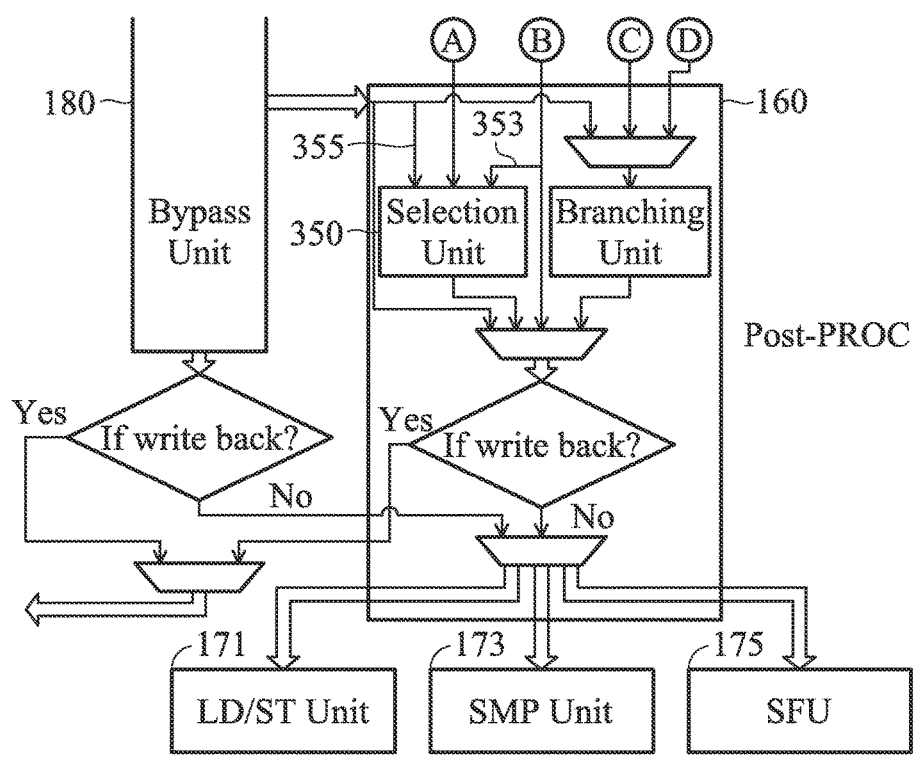

The computation units of the architecture may be modified to enable the GPU to execute the combined instructions. FIGS. 3A and 3B illustrate the system architecture of a 3D graphics processing apparatus according to an embodiment of the invention. The adder 310 obtains the value of CR R4 and the value of CR R8 (that is, the values of variables b and a) through the pre-ALU (Arithmetic Logic Unit) and sends the calculation result to the comparator 330 through the normalizer and the formatter. The comparator 330 receives the result generated by the ALG unit 140 (the prior stage), obtains the value of CR R5 (that is, the value of variable c) through the bypass unit 180, and compares the two. The selection unit 350 writes one of the result 353 (that is, the value of variable x) generated by the adder 310 and the value 355 of CR R5 received from the bypass unit 180 back to the CR R0 according to the comparison result (the output from the prior stage) 351. In order to execute the combined instruction, the computation units of the ALG unit 140 are coupled to the DF unit 130 and the bypass unit 180 for obtaining operands, and the computation units of the comparison/logic unit 150 and the Post-PROC unit 160, such as the comparator 330 and the selection unit 350, for outputting the results to the next stage. The computation units of the comparison/logic unit 150 are coupled to the ALG unit 140 and the bypass unit 180 for obtaining operands, and the computation units of the Post-PROC unit 160, such as the selection unit 350, for outputting the results to the next stage. The computation units of the Post-PROC unit 160 are coupled to the ALG unit 140, the comparison/logic unit 150 and the bypass unit 180 for obtaining operands, and coupled to the CRs, the LD/ST unit 171, the SMP unit 173 and the SFU 175 through the selection unit 350 for writing back the data to the CRs or outputting the results to the post-processing units. In addition to the selection unit 350, the Post-PROC unit 160 further includes a branching unit and a determination unit for determining whether to write back the results to the CRs.

Figure 4:
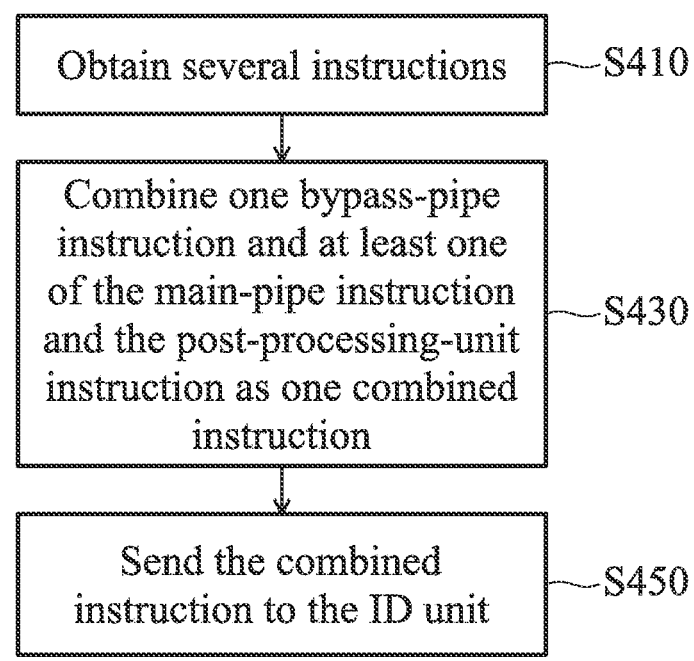
FIG. 4 is a flowchart illustrating a method for combining instructions according to an embodiment of the invention.

With the above architecture, the compiler may combine the bypass-pipe instruction and the main-pipe instructions and/or the post-processing-unit instructions as one, referred to as the bypassed combination. FIG. 4 is a flowchart illustrating a method for combining instructions according to an embodiment of the invention. The compiler may obtain several instructions (step S410), combine one bypass-pipe instruction and at least one of the main-pipe instruction and the post-processing-unit instruction as one combined instruction (step S430) and send the combined instruction to the ID unit 120 (step S450). In step S430, the combination order for the main-pipe instructions may follow the aforementioned rules. In other words, step S430 may be considered that the combined result for several main-pipe instructions is combined with one bypass-pipe instruction and/or one post-processing-unit instruction. An example is introduced to explain the bypassed combination, where machine code is as follows:

| MOV | R0, | R4 |
|---|---|---|
| +FADD | SFWD, | .R4, R8 |
| RCP | R7, | SFWD |

First machine code instructs to store the value of CR R4 in the CR R0. Second machine code instructs to add the value of CR R4 to the value of CR R8, and send the result to the next stage, in which "+" indicates that this instruction is combined with the previous one and "SFWD" indicates a passing of the result to the next stage. Third machine code instructs to obtain a reciprocal of the value received from the prior stage and stores the reciprocal in the CR R7, in which "SFWD" indicates a reception of the result from the prior stage.

Figure 5:
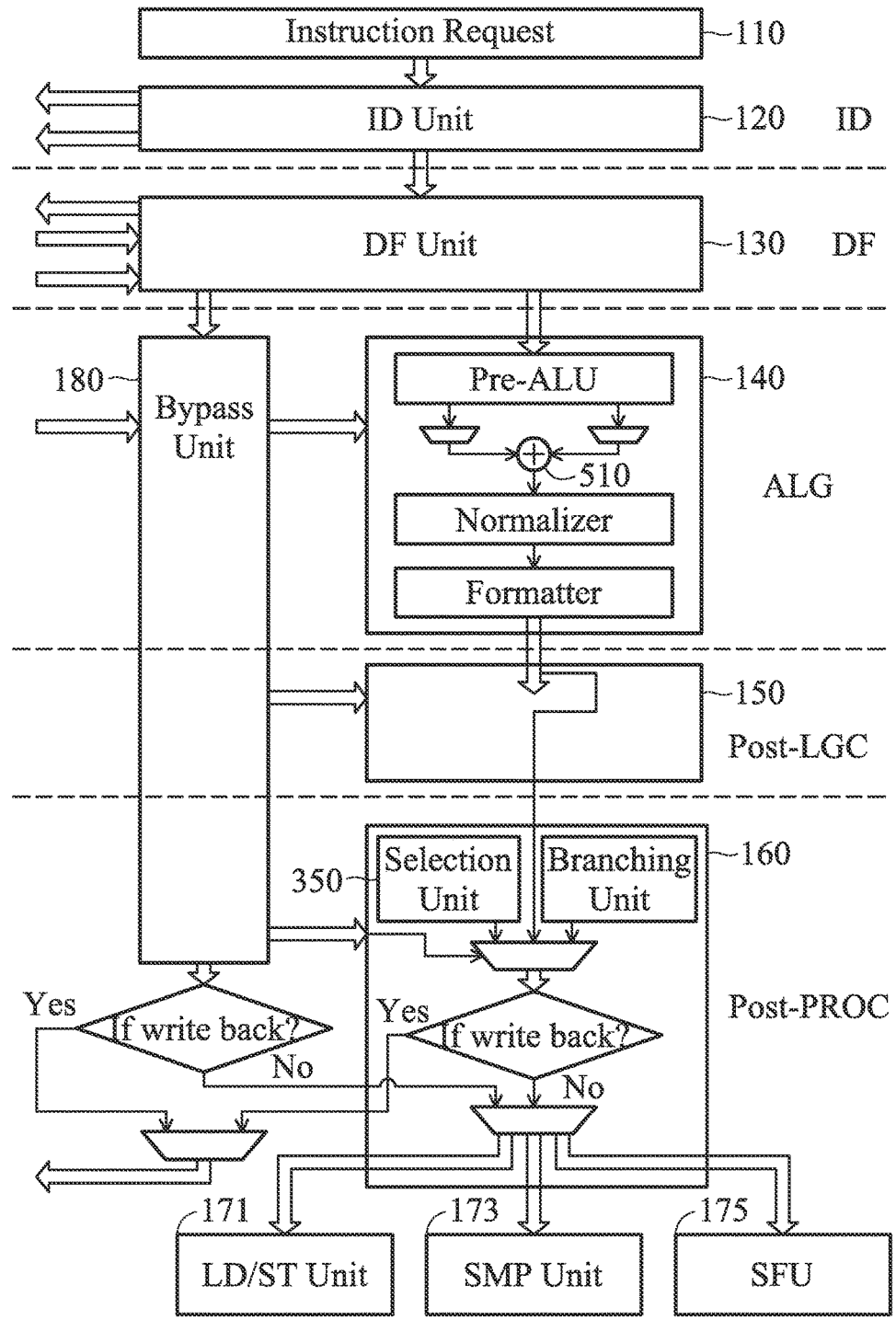
FIG. 5 illustrates the system architecture of a 3D graphics processing apparatus according to an embodiment of the invention.

FIG. 5 illustrates the system architecture of a 3D graphics processing apparatus according to an embodiment of the invention. The bypass unit 180 receives the instruction of the DF unit 130 to read the value of the CR R4 and write it in the CR R0. At the same time, the adder 510 obtains the value of CR R4 and the value of CR R8 through the pre-ALU and sends the calculation result to the SFU 175 through the normalizer and the formatter. The SFU 175 calculates the reciprocal of the received value and writes the reciprocal in the CR R7. The performance of one SP can be improved because the operations of the main-pipe instruction and the post-processing-unit instruction are performed in parallel of the operation of the bypass-pipe instruction.

Refer to FIGS. 3 and 5. To sum up, the ALG, comparison/logic and Post-PROC units are coupled in series and each of the ALG, comparison/logic and Post-PROC units is coupled to the bypass unit so as to execute the combined instruction. Specifically, the first computation unit of the ALG unit 140, such as the adder, the multiplier, the divider, etc., is coupled to the bypass unit 180 (that is, the bypass-pipe) and the DF unit 130 for obtaining the operands from the bypass unit 180 and/or the DF unit 130. The second computation unit of the comparison/logic unit 150, such as the comparator, any of wide range of logical gates, etc., is coupled to the bypass unit 180 and the output of the first computation unit for obtaining operands from the bypass unit 180 and/or the output of the first computation unit. The third computation unit of the Post-PROC unit 160, such as the selection unit, the branching unit, etc., is coupled to the bypass unit 180, the output of the first computation unit and the output of the second computation unit for obtaining operands from the bypass unit 180, the output of the first computation unit and the output of the second computation unit. The third computation unit is further coupled to the LD/ST unit 171, the SMP unit 173 and the SFU 175 for outputting the operation results to the post-processing units.

Although the embodiments have been described in FIGS. 1, 3 and 5 as having specific elements, it should be noted that additional elements may be included to achieve better performance without departing from the spirit of the invention. While the process flows described in FIGS. 2 and 4 include a number of operations that appear to occur in a specific order, it should be apparent that these processes can include more or fewer operations, which can be executed serially or in parallel, e.g., using parallel processors or a multi-threading environment.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for combining instructions, performed by a compiler, the method comprising:
   obtaining a plurality of first instructions, wherein each first instruction performs one of a calculation operation, a comparison operation, a logic operation, a selection operation, a branching operation, a LD/ST (Load/Store) operation, a SMP (sampling) operation and a complicated mathematics operation;
   combining the first instructions according to data dependencies between the first instructions;
   obtaining a second instruction, wherein the second instruction is used for sending data from a CR (Common Register) or a CB (Constant Buffer) to another CR or a post-processing unit;
   combining a combined result for the first instructions with the second instruction as one combined instruction; and
   sending the combined instruction to a SP (Stream Processor),
   wherein a performance of an operation of the first instructions by the SP is in parallel of a performance of an operation of the second instruction by the SP, wherein the SP comprises:

a DF (Data Fetch) unit;
a bypass-pipe, coupled to a CR (Common Register), a CB (Constant Buffer) and the DF unit; and
a main-pipe, coupled to the DF unit and the bypass-pipe, comprising an ALG (Algorithm) unit, a comparison/logic unit and a post-PROC (Process) unit,
wherein the ALG, comparison/logic and post-PROC units are coupled in series and each of the ALG, comparison/logic and post-PROC units is coupled to the bypass-pipe, and
wherein a first computation unit of the ALG unit is coupled to the bypass-pipe and the DF unit for obtaining operands from the bypass-pipe and/or the DF unit.

2. The method of claim 1, wherein the first instructions are combined according to the following rules:
ALG+CMP+SEL;
ALG+CMP+SEL+SFU/LS/SMP;
ALG+CMP+Branch;
ALG+LGC+SEL;
ALG+LGC+SEL+SFU/LS/SMP; or
ALG+LGC+Branch,
ALG indicates a calculation instruction, CMP indicates a comparison instruction, LGC indicates a logic instruction, SEL indicates a selection instruction, Branch indicates a branching instruction, SFU indicates a mathematics computation instruction, LS indicates a Load/Store instruction and SMP indicates a sampling instruction.

3. The method of claim 1, wherein a second computation unit of the comparison/logic unit is coupled to the bypass-pipe and a first output of the first computation unit for obtaining operands from the bypass-pipe and/or the first output; and a third computation unit of the post-PROC unit is coupled to the bypass-pipe, the first output of the first computation unit and a second output of the second computation unit for obtaining operands from the bypass-pipe, the first output and/or the second output.

4. The method of claim 1, wherein the main-pipe executes the first instructions and the bypass-pipe executes the second instruction.

5. An apparatus having a plurality of data pipes, comprising:
logic for obtaining a plurality of first instructions, wherein each first instruction performs one of a calculation operation, a comparison operation, a logic operation, a selection operation, a branching operation, a LD/ST (Load/Store) operation, a SMP (sampling) operation and a complicated mathematics operation;
logic for combining the first instructions according to data dependencies between the first instructions;
logic obtaining a second instruction, wherein the second instruction is used for sending data from a CR (Common Register) or a CB (Constant Buffer) to another CR or a post-processing unit;
logic for combining a combined result for the first instructions with the second instruction as one combined instruction; and
logic for sending the combined instruction to a SP (Stream Processor),
wherein a performance of an operation of the first instructions by the SP is in parallel of a performance of an operation of the second instruction by the SP, wherein the SP comprises:
a DF (Data Fetch) unit;
a bypass-pipe, coupled to a CR (Common Register), a CB (Constant Buffer) and the DF unit; and
a main-pipe, coupled to the DF unit and the bypass-pipe, comprising an ALG (Algorithm) unit, a comparison/logic unit and a post-PROC (Process) unit,
wherein the ALG, comparison/logic and post-PROC units are coupled in series and each of the ALG, comparison/logic and post-PROC units is coupled to the bypass-pipe,
wherein the main-pipe performs an operation of a main-pipe instruction and the bypass-pipe performs an operation of a bypass-pipe instruction in parallel, and
wherein a first computation unit of the ALG unit is coupled to the bypass-pipe and the DF unit for obtaining operands from the bypass-pipe and/or the DF unit.

6. The apparatus of claim 5, wherein a first computation unit of the ALG unit is coupled to the bypass-pipe and the DF unit for obtaining operands from the bypass-pipe and/or the DF unit; a second computation unit of the comparison/logic unit is coupled to the bypass-pipe and a first output of the first computation unit for obtaining operands from the bypass-pipe and/or the first output; and a third computation unit of the post-PROC unit is coupled to the bypass-pipe, the first output of the first computation unit and a second output of the second computation unit for obtaining operands from the bypass-pipe, the first output and/or the second output.

7. The apparatus of claim 6, wherein the third computation unit is coupled to a LD/ST (Load/Store) unit, a SMP (Sampling) unit and a SFU (Special Function Unit) for outputting an operation result.

8. The apparatus of claim 7, wherein the LD/ST unit performs a loading or storing instruction, the SMP unit performs a texture sampling instruction and the SFU unit performs a mathematics computation instruction.

9. The apparatus of claim 5, wherein the main-pipe instruction is one of a calculation instruction, a comparison instruction, a logic instruction, a selection instruction and a branching instruction and the bypass-pipe instruction is a moving instruction.

* * * * *